Figure 1:
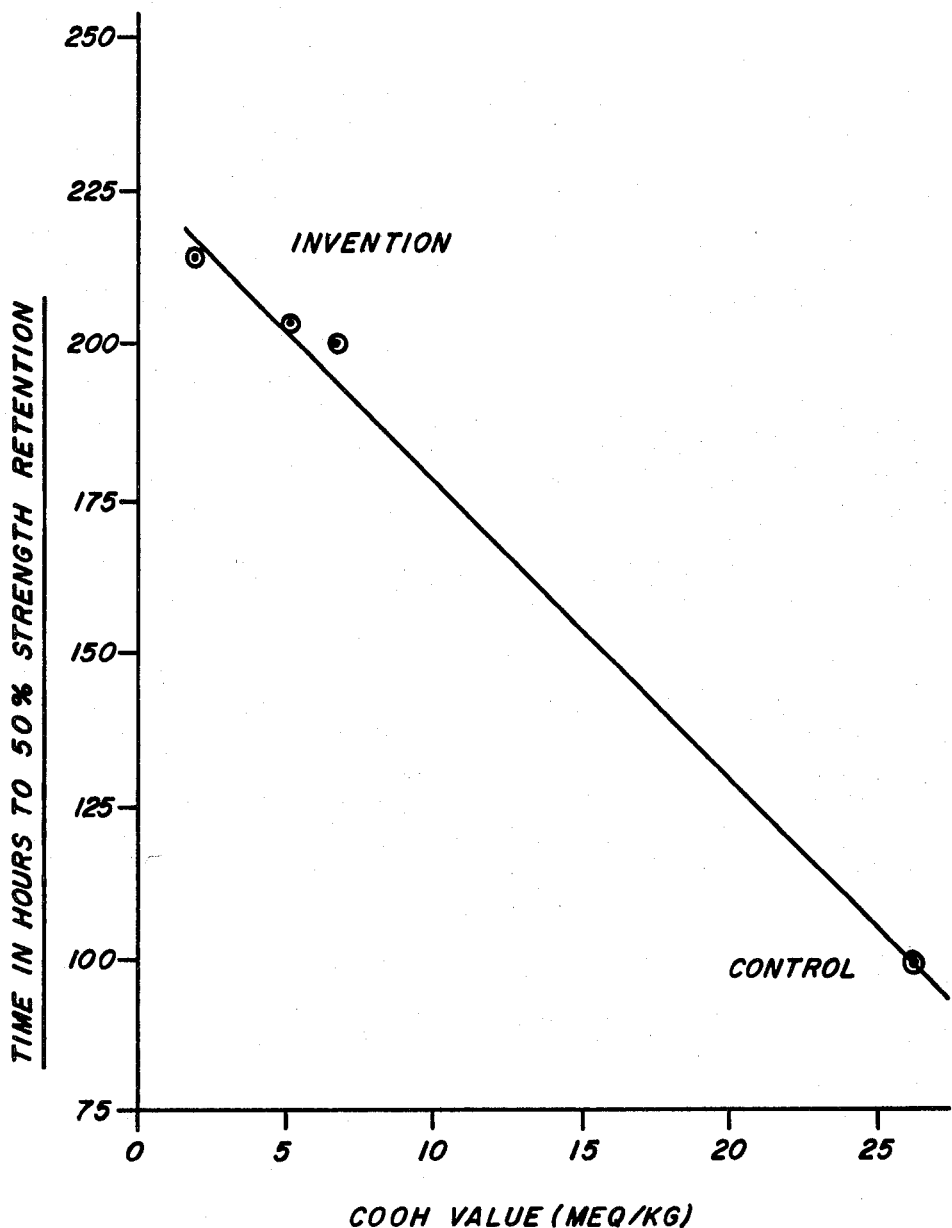

United States Patent [19]

Rothwell et al.

[11] 4,374,960

[45] Feb. 22, 1983

[54] PRODUCTION OF POLYESTER FIBERS OF IMPROVED STABILITY

[75] Inventors: Ronald E. Rothwell, Colonial Heights, Va.; Hugh H. Rowan, Chapel Hill; James J. Dunbar, Cary, both of N.C.

[73] Assignee: Allied Corporation, Morris Township, Morris County, N.J.

[21] Appl. No.: 302,908

[22] Filed: Sep. 16, 1981

[51] Int. Cl.³ .................. C08G 69/48; C08L 77/06
[52] U.S. Cl. .............................. 525/436; 525/439; 528/289; 528/292; 528/297
[58] Field of Search .............. 528/289, 297, 292; 525/436, 439

[56] References Cited

U.S. PATENT DOCUMENTS

| | | | |
|---|---|---|---|
| 2,465,319 | 3/1949 | Whinfield et al. | 260/75 |
| 2,863,854 | 12/1958 | Wilson | 525/439 |
| 3,050,533 | 8/1962 | Munro et al. | 260/346.1 |
| 3,051,212 | 8/1962 | Daniels | 152/330 |
| 3,427,287 | 2/1969 | Pengilly | 260/75 |
| 3,484,410 | 12/1969 | Lazarus et al. | 260/75 |
| 3,491,066 | 1/1970 | Petropoulos | 525/439 |
| 3,627,867 | 12/1971 | Schwarz | 264/211 |
| 3,657,191 | 4/1972 | Titzmann et al. | 525/439 |
| 3,869,427 | 3/1975 | Meschke et al. | 528/297 |
| 4,016,142 | 4/1977 | Alexander et al. | 260/75 T |
| 4,139,521 | 2/1979 | Lazarus et al. | 528/289 |
| 4,205,158 | 5/1980 | Hoeschele | 528/297 |

Primary Examiner—Lucille M. Phynes
Attorney, Agent, or Firm—Richard A. Anderson

[57] ABSTRACT

There is provided by this invention a process for the production of high molecular weight linear polyethylene terephthalate condensation polyesters which are useful especially for preparing specialty fibers which have excellent resistance to degradation so that they can be used in such commercial articles as paper making machine fabric, industrial belting, etc. The improved high molecular weight linear polyethylene terephthalate condensation polyester specialty fibers are characterized by improved hydrolytic stability and by reduction in the free carboxyl content so as to have a carboxyl concentration of less than about 6 gram equivalents per $10^6$ grams of the polyester. These polyester specialty fibers are prepared by the steps of adding an end capping reagent to particles of the said feed polymer, heating to obtain a homogeneous mixture of the said polyester and end capping reagent, mechanically working the polyester melt, and forming filaments of the linear polyester having a reduced free carboxyl content.

7 Claims, 2 Drawing Figures

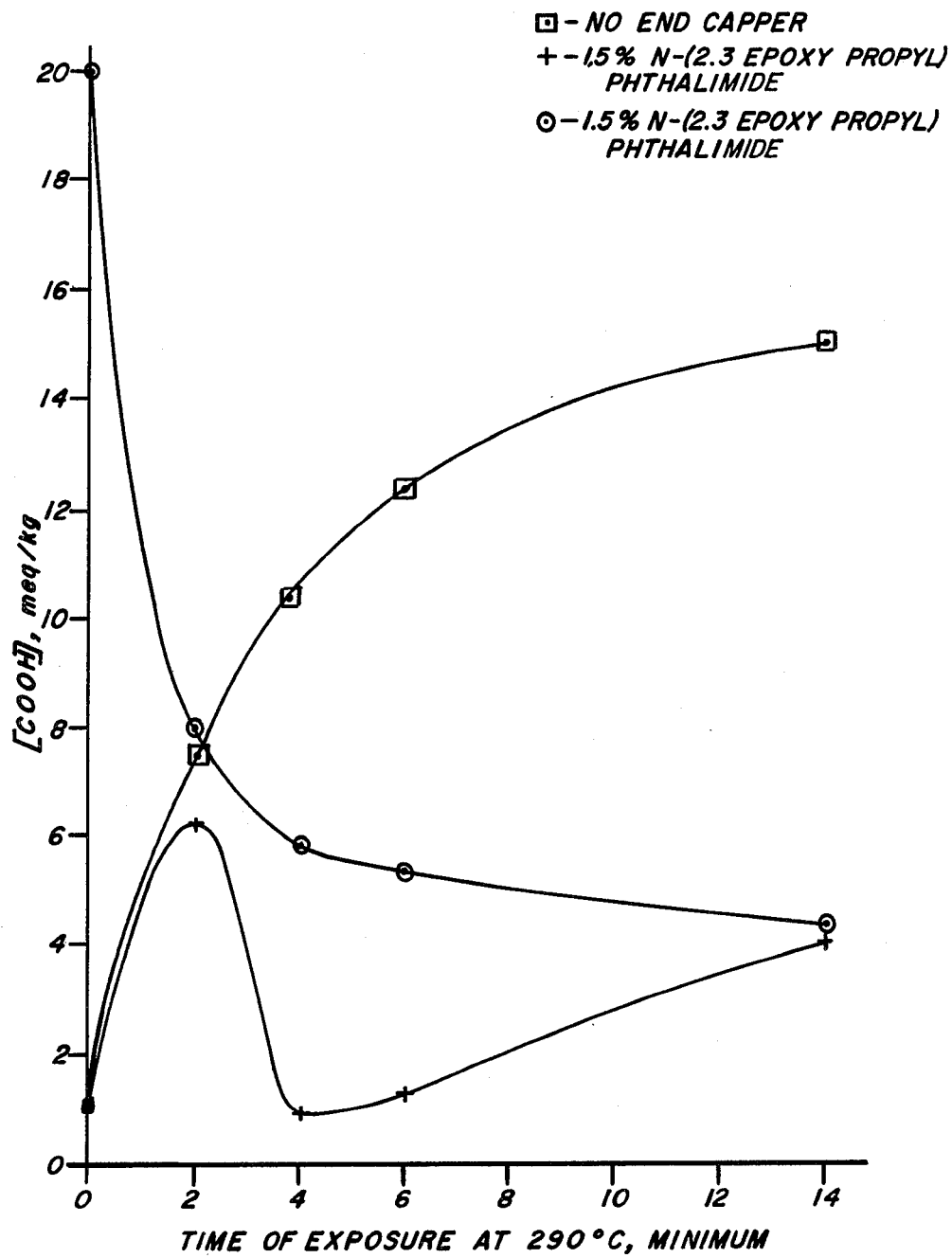

PRODUCTION OF POLYESTER FIBERS OF IMPROVED STABILITY

TECHNICAL FIELD

This invention relates to methods for the production of condensation polyesters having improved hydrolytic stability and reduced free carboxyl contents, and more particularly to methods for the production of improved condensation high molecular weight polyester materials in the form of monofilaments, which have excellent resistance to degradation can be produced which are useful in such commercial articles as paper making machine fabric, industrial belting, etc.

BACKGROUND ART

High molecular weight polyethylene terephthalate fiber forming polyesters are well-known in the art. They are prepared commercially either by the ester interchange reaction between dimethyl terephthalate and ethylene glycol, or by the direct esterification process wherein terephthalic acid is reacted directly with ethylene glycol. Products and processes of these types are described, for example, in U.S. Pat. Nos. 2,465,319, 3,050,533, 3,051,212, 3,427,287 and 3,484,410, all hereby incorporated by reference.

Fibers and cords produced from polyethylene terephthalate esters are known to exhibit excellent dimensional stability, that is, they exhibit low extension or growth during use and have resistance to thermal degradation. However, when used in applications where a high degree of heat is built up during use as in pneumatic tires and industrial belts which operate under high speed conditions under heavy load, a loss of tensile strength is often experienced because of these conditions. Efforts to remedy these problems have not always been effective.

Most research in the field has been directed to producing a high molecular weight linear polyester which has a low content of free carboxyl groups as the art is aware that the lower the content of free carboxyl groups and the higher the hydrolytic stability, the better the fibers and cords perform under high speed and heavy load conditions.

A number of U.S. patents have issued which are directed to solutions to this problem. Thus, U.S. Pat. No. 3,051,212 suggests production of a polyester having a free carboxyl content of less than 15 equivalents by treating the filaments after they have been formed with a chemical reagent which "caps" the free carboxyl group, one such agent being diazomethane.

In U.S. Pat. No. 3,627,867, the solution is to reduce the normally high carboxyls by injecting ethylene oxide or other low-boiling oxirane compound before the molten polyester is fed into the melt-spinning machine. U.S. Pat. No. 3,657,191, hereby incorporated by reference, seeks to improve stability by reacting the polyesters with ehtylene carbonates or monofunctional glycidyl ethers. Also, U.S. Pat. No. 3,869,427, hereby incorporated by reference, seeks to overcome the heat degradation problem by mixing with the molten polyester prior to melt-spinning, 1,2-epoxy-3-phenoxypropane or 1,2-epoxy-3-n-hexyloxypropane. Further, U.S. Pat. No. 4,016,142, hereby incorporated by reference, suggests reduction of the number of free carboxyl end groups also by adding a glycidyl ether to the polyester to react with carboxyl end groups which are present so as to form free hydroxyl end groups.

In U.S. Pat. No. 4,139,521, hereby incorporated by reference, there is disclosed and claimed a process for improving heat stable fiber forming linear condensation polyesters by incorporating therein a stabilizing amount of a stabilizer comprising an N-epoxyalkylimide of a dicarboxylic acid.

In the prior art, techniques have been developed to produce tire yarn having a free carboxyl concentration of less than 10 grams equivalents of carboxyl group per $10^6$ grams of polyester (sometimes hereinafter referred to as milliequivalents or meq of carboxyls per kg polymer).

The process of the present invention is an improvement over these prior disclosed and claimed processes in the provision of linear condensation polyesters in which there is achieved a reduction of the carboxyl content to a concentration of less than about 5 gram equivalents per $10^6$ grams of polyester specialty fiber.

SUMMARY OF THE INVENTION

It is accordingly one object of this invention to provide a method for the production of improved high molecular weight linear terephthalate condensation polyester specialty monofilaments and/or fibers.

A further object of the invention is to provide methods for the production of linear terephthalate condensation polyester monofilaments which have improved hydrolytic stability and a reduced free carboxyl content below 5 meq.

A still further object of the present invention is to provide a method for the production of improved hydrolysis resistant monofilaments especially for use under wet conditions such as during paper making or where a high degree of steam and/or heat is built up during use, said filaments being produced from linear terephthalate condensation polyesters in which the hydrolytic stability is improved and the free carboxyl content has been reduced to less than about 5 gram equivalents per $10^6$ grams of polyester.

Other objects and advantages of the present invention will become apparent as the description thereof proceeds.

The preferred use of the special monofilaments of this invention is to make fabric for processing and drying wet pulp to make paper. These originally were metal wire screens or metal fabrics. For example, see Kirk-Othmer Encyclopedia of Chemical Technology (2nd Ed.) (Interscience) 1967, Vol. 14, pp. 503–508, hereby incorporated by reference.

In satisfaction of the foregoing objects and advantages, there is provided by this invention a method for the production of high molecular weight linear polyethylene terephthalate condensation polyester specialty monofilament by the steps which comprise:

obtaining particles or chips of said high molecular weight linear polyethylene terephthalate condensation polyester;

adding an end capping reagent to said particles;

heating the mixture of said polyester particles and end capping reagent to obtain a substantially homogeneous melt;

mechanically working said polyester melt and spinning into filaments the linear polyester being characterized by improved hydrolytic stability and having a reduced free carboxyl content so as to have a carboxyl concentration of less than about 5 gram equivalents per $10^6$ grams of polyester.

Also provided by this invention is a method for the production of monofilaments of the polyester, which exhibit extremely good resistance to hydrolysis and much greater resistance to thermal degradation.

BEST MODE FOR CARRYING OUT THE INVENTION

The present invention in its main embodiment provides a method for producing improved high molecular weight linear polyethylene terephthalate condensation polyesters. These improved polyesters are especially characterized by an improved hydrolytic stability and a reduction in the free carboxyl content so as to have a carboxyl concentration of less than about 5 gram equivalents per $10^6$ grams of polyester.

As a result of the improved characteristics, the fibers are especially suitable for use in the production of commercial products which require excellent resistance to hydrolysis or degradation such as paper making machine fabric, industrial belting, etc. These improved characteristics are needed in paper making fabric because of wet conditions causing hydrolysis, and industrial belts because they operate under severe conditions such as steam or under heavy loads or stress and high temperatures. These conditions can cause loss of tensile strength and ultimate failure with high carboxyl content filaments. See FIG. 1, control versus this invention.

In the process of the present invention it has been found that these improved characteristics can be obtained by mixing chips or particles of the prepared polyethylene terephthalate polyester with an end capping reagent, remelting to obtain a substantially homogeneous mixture, and then subjecting to mechanical working such as extrusion, to produce the polyester specialty monofilament of improved hydrolytic stability.

The preparation of polyesters by condensing an aromatic dicarboxylic acid such as terephthalic acid and/or a lower alkyl ester thereof with a glycol, is well known in the art. These reactions are carried out using a glycol containing about 2 to 10 carbon atoms per molecule under direct esterification and/or ester-interchange conditions.

The esterification of the aromatic dicarboxylic acid and/or the lower alkyl esters thereof and the glycol can start at a temperature as low as 200° C. and range up to 300° C. and at atmospheric and super-atmospheric pressures ranging up to 500 psig. The reaction, either the direct esterification or ester interchange, is carried out in the absence of oxygen-containing gas. Preferably, the reaction temperature ranges from about 230° C. to about 280° C. and at a pressure ranging from about 50 to 250 psig. The reaction time will vary depending upon the reaction temperature and pressure. The glycol is reacted with the aromatic dicarboxylic acid and/or the lower alkyl ester thereof in an amount ranging from about 1 to about 3 mols of glycol per mol of acid.

Additives can be added to the polymer with complete compatibility therewith to control or tailor the reactions in order to obtain required characteristics of the final polymer for specific end uses.

The polycondensation of the esterification product obtained by the direct esterification of ester interchange reaction between aromatic dicarboxylic acid or lower alkyl ester thereof with a glycol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measures is obtained. The duration of such periods depends upon such factors of process polymerization conditions, as pressure and temperature profiles, catalyst type and concentration, any additives, etc. Polycondensation may be continued until the resultant polyester has an intrinsic viscosity of about 0.6 to 1.0, preferably 0.8 to 1.0. Alternatively, polycondensation can be conducted according to U.S. Pat. No. 4,238,593.

As a result of the basic process of preparation, the linear polyethylene terephthalate condensation polyesters are obtained. The polyester products are then formed into small pieces or chunks, preferably referred to herein as chips. The formation of the chips may be by any method including cutting, grinding, and the like as is well-known. According to the present invention, it has been found that these chips or particles can then be treated and mechanically worked in a manner to obtain the advantages set forth herein.

In the first step of the invention the particles or chips are mixed with about 5 to 70 gram moles of the end capping reagent per $10^6$ grams of the polyester present. Thereafter, the mixture of end capping reagent and particles or chips are melted to obtain a melt of the polyester and end capping reagent. Preferably, at this point, a substantially homogeneous mixture is obtained so that there is substantial uniform distribution of the end capping reagent within the melt. Preferably sufficient end capping reagent should be added so that a 40 percent excess reagent over the original carboxyl content of the polymer exists. Intrinsic viscosity of the polyester may be determined conventionally in a 60 percent phenol–40 percent tetrachloroethane mixture.

The end capping reagent to be added to the chips of polyethylene terephthalate may be any of several known end capping materials. Useful end capping reagents include known materials such as the N-epoxyalkylamides of dicarboxylic acids, e.g., N-(epoxyethyl) succinimide, all of which are readily prepared and commercially available and described, for example, in U.S. Pat. No. 2,730,531. Also, the N-(2,3-epoxypropyl) phthalimide may be employed. These reagents are more fully described in U.S. Pat. No. 4,139,521 and the disclosure thereof is incorporated herein by reference.

Other suitable end capping reagents include long chain aliphatic epoxides such as 1,2-epoxy-3-phenoxypropane and 1,2-epoxy-3-n-hexyloxypropane, as described in U.S. Pat. No. 3,869,427. These materials are preferably employed in the presence of a catalyst, and optionally a color stabilizer such as triphenylphosphite or phosphate. The long chain aliphatic epoxides include those epoxides which have alkyl groups in the range of about $C_8$ up to about $C_{14}$. The commercially available materials sold as PG Expoxide No. 7 and PG Epoxide No. 8, available commercially from Proctor and Gamble, are especially suitable.

Ethylene carbonate, described in U.S. Pat. No. 3,657,191, is a known material which may also be employed as an end capping reagent. Both the ethylene carbonate and the long chain aliphatic epoxides are preferably used in combination with a catalyst.

Other additives which may be employed to lower the carboxyl content of the polyesters include diazomethane, described in U.S. Pat. No. 3,051,212, monofunctional glycidyl ethers, described for this purpose in U.S. Pat. Nos. 3,667,191 and 4,016,142. Mixtures of end capping reagents may also be employed.

In its broadest embodiment, the resulting homogeneous mixture of polyester and end capping reagent are subjected to mechanical working to effect sufficient reaction to produce a low carboxyl content and improve the hydrolytic stability. The mechanical working step is any physical manipulation of the homogeneous mixture at an elevated temperature for a residence time of about 2 to 20 minutes. Temperatures of about 200° C. to 300° C. are especially preferred.

In order to reduce cost, the preferred feed material is solid state polymer having very low carboxyl content of less than 5 meq. When this material is used, less end capping reagent is added because of the original low carboxyl content. However, some end capping reagent is necessary to overcome carboxyl regain during melting and spinning.

In a preferred embodiment of the invention the mechanical working stage is carried out by extrusion of a melt of the mixture. In this preferred embodiment, a homogeneous melt of polyester and end capping reagent are subjected to extrusion. The extrusion may be carried out in any known manner for the production of monofilaments of the linear polyester at temperatures of about 270° C. to about 300° C. It is preferred that the extruder be one designed with a mixing zone within the extruder so as to obtain a residence time in the range of about 5 to 10 minutes. In the embodiment where the ethylene carbonate is employed with a catalyst and color stabilizer, the extruder should be provided with back pressure venting, a mixing zone, and a vent zone. The most preferable extrusion device is a so-called twin screw extruder or a multiple vent extruder so that carbon dioxide produced can be removed.

The extrusion and spinning into filaments may be carried out in any known manner as described, for example, in U.S. Pat. Nos. 4,072,457; 4,072,663; 3,999,910; 4,030,651 and 4,024,698, the disclosure of which are incorporated herein by reference.

The polyesters produced are of reduced carboxyl content and improved hydrolytic stability. The filaments of these polyesters have excellent resistance to degradation or hydrolysis when utilized in commercial articles such as paper making machine fabric, industrial belting, etc. wherein a high degree of heat is built up during use, or the belting is subject to continuously wet conditions.

The following examples are presented to illustrate the invention but it is not to be considered as limited thereto. In the examples and throughout the specification, parts are by weight unless otherwise indicated.

In the prior art, monofilaments are produced by re-extruding high intrinsic viscosity polyester chips using a single screw extruder. The carboxyl level due to water content and degradation is equal to or higher than 25 to 30 milliequivalents/kilogram. Thus, hydrolytic stability, for example, breaking strength retained at 50° C. in wet air is less than 70 percent. For insignificant loss, carboxyl levels should be equal to or less than 6 milliequivalents. See FIG. 1.

Generally there are three methods to overcome this breaking strength retention problem with monofilaments.

(1) Add an additive to lower carboxyl content such as N-2,3-epoxypropyl phthalimide or the same compound substituted on a benzene ring to chips before remelting. The extruder screw must be designed with a mixing zone and 5 to 10 minutes residence time from melting to spinning.

(2) An ethylene carbonate or equivalent and catalyst can be added to the chips before remelting for re-extrusion. The extruder screw must be designed for removal of volatile by-product of end capping reaction.

(3) To the chips can be added a long chain aliphatic oxide such as decyl glycidyl ether (PG-7) or preferably dodecyl glycidyl ether (PG-8) with catalyst and color stabilizer. PG-8 is non-mutagenic.

FIG. 2 illustrates two embodiments of this invention. The lower curve shows the carboxyl level regain which occurs using a very low carboxyl level (e.g., 2-3 milliequivalents) feed material polyester particles and low amounts of end capping reagent added to the particles during melting and spinning. The upper curve shows the carboxyl level reduced by means of end capping reagent added in greater amounts to a high carboxyl level (e.g., 20-30 milliequivalents) feed material of polyester particles, during melting and spinning. The low carboxyl content feed material can be produced by solid state polymerization or by the methods of the examples below, particularly Example 3.

Following are specific examples of methods to make the improved monofilament which is less subject to hydrolysis and has improved breaking strength retention.

EXAMPLE 1–CONTROL

One hundred pounds per hour of polyester chip of 0.95 intrinsic viscosity made by the procedure of U.S. Pat. No. 3,484,410, hereby incorporated by reference, is dried to 0.01 percent water, melted and extruded using a 3-inch diameter, 24:1 length to diameter ratio extruder. The molten polymer is extruded through a typical monofilament die, quenched, taken up, and drawn according to the typical process such as in U.S. Pat. No. 4,030,651 and 3,999,910, hereby incorporated by reference. A carboxyl value is found to be 26 milliequivalents/kg.

This material is then exposed to saturated steam for various trial periods after which the tensile properties are measured. It is found that the time in hours to the point where the residual strength is fifty percent of the initial strength is 104 hours.

EXAMPLE 2

Polyester chips as in Example 1 are blended with 0.7 percent N-2,3-epoxypropyl phthalimide as described in Example 2 of U.S. Pat. No. 4,139,521. This material is extruded to monofilament using the extruder, as described above, but with the addition of a mixing zone such as described in U.S. Pat. No. 3,411,179, hereby incorporated by reference, and with the piping and spin manifold designed to provide five minutes residence time before the spinnerette.

Carboxyl value is found to be 6 meq per kg. The time of exposure to saturated steam to 50 percent break strength is found to be 199 hours.

EXAMPLE 3

Polyester chips as in Example 1 are blended with one percent ethylene carbonate, 0.005 percent potassium iodide and 0.03 percent triphenyl phosphite. The chips are melted and mixed by the extruder of Example 2 and fed through a devolatilizing unit to remove by-products of the carboxyl end capping reaction prior to spinning. The devolatilizing unit can be any known to those skilled in the art, such as a small vacuum extractor, a Luwa Filmtruder, a multichamber Farrell Diskpack unit. In place of the extruder/devolatilizer, a twin screw extruder with vacuum capability such as manufactured by Werner-Pfleiderer, or a multivent extruder may be substituted.

The carboxyl value is found to be 2 meq. per kg. The time of exposure to saturated steam to 50 percent break strength retention is found to be 211 hours.

EXAMPLE 4

Example 2 is repeated except that 1.0 percent of PG-8, defined in U.S. Pat. No. 3,869,427 above, plus 0.005 percent KI and 0.03 percent triphenyl phosphite are substituted for the N-2,3-epoxypropyl phthalimide.

The carboxyl value is found to be 5 meq. per kg. The time is found to be 202 hours to 50 percent break strength retention in saturated steam.

Improvement over the control of Examples 2, 3 and 4 is shown in FIG. 1.

EXAMPLE 5

Example 2 is repeated using solid state low COOH feed chips and N-2,3-epoxypropyl phthalimide.

Carboxyl value is found to be 3 meq. and exposure time is found to be 201 hours.

The invention has been described herein with reference to certain preferred embodiments; however, its obvious variations thereon will become apparent to those skilled in the art. The invention is not to be considered as limited thereto.

We claim:

1. A process for the preparation of high molecular weight linear polyethylene terephthalate condensation polyesters, said polyesters being characterized by improved hydrolytic stability and by reduction in the free carboxyl content so as to have a carboxyl concentration of less than about 5 gram equivalents per $10^6$ grams of polyester, the process comprising the steps of adding an end capping reagent in an amount of about 5 to 170 gram moles per $10^6$ grams of polyester, wherein the end capping reagent is selected from the group consisting of N-epoxyalkylimides of dicarboxylic acids, long chain aliphatic epoxides, ethylene carbonate, diazomethane, monoglycidyl ethers, and mixtures thereof, to particles of the said linear polyester, heating the mixture to obtain a substantially homogeneous mixture of said polyester, while subjecting said mixture to extrusion and spinning for a residence time of about 5 to 10 minutes to produce monofilaments of said linear polyester of reduced free carboxyl content of less than about 5 gram equivalents per $10^6$ grams of polyester.

2. A process according to claim 1 wherein a catalyst is added to the mixture.

3. A process according to claim 1 wherein the end capping reagent is an N-epoxyalkylimide.

4. A process according to claim 1 wherein the end capping reagent is a long chain aliphatic epoxide.

5. A process according to claim 1 wherein the end capping reagent is ethylene carbonate.

6. A process according to claim 1 wherein the end capping reagent is diazomethane.

7. A process according to claim 1 wherein the end capping reagent is a monofunctional glycidyl ether.

* * * * *